(12) United States Patent
Landau

(10) Patent No.: US 8,155,202 B2
(45) Date of Patent: Apr. 10, 2012

(54) SYSTEM AND METHOD FOR ENCODING SCROLLING RASTER IMAGES

(75) Inventor: Airan Landau, San Jose, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 1101 days.

(21) Appl. No.: 12/008,716

(22) Filed: Jan. 11, 2008

(65) Prior Publication Data
US 2008/0170619 A1 Jul. 17, 2008

Related U.S. Application Data

(60) Provisional application No. 60/884,773, filed on Jan. 12, 2007, provisional application No. 60/884,744, filed on Jan. 12, 2007, provisional application No. 60/884,772, filed on Jan. 12, 2007.

(51) Int. Cl.
H04N 7/12 (2006.01)
H04N 11/02 (2006.01)
H04N 11/04 (2006.01)

(52) U.S. Cl. ......... 375/240.16; 375/240.03; 375/240.26; 375/240.24

(58) Field of Classification Search ............. 375/240.16, 375/240, 240.03, 240.24, 240.26; 348/401–412; 709/226–231, 246–247; 725/116–131
See application file for complete search history.

(56) References Cited

U.S. PATENT DOCUMENTS

| | | | |
|---|---|---|---|
| 5,815,604 A | | 9/1998 | Simons et al. ............. 382/250 |
| 5,844,594 A | * | 12/1998 | Ferguson ................... 725/131 |
| 5,845,083 A | * | 12/1998 | Hamadani et al. ........ 709/231 |
| 5,867,208 A | * | 2/1999 | McLaren .................... 725/139 |
| 6,052,555 A | * | 4/2000 | Ferguson ................... 725/116 |
| 6,266,369 B1 | * | 7/2001 | Wang et al. ............... 375/240 |

(Continued)

FOREIGN PATENT DOCUMENTS

EP 0 661 888 A2 7/1995

(Continued)

OTHER PUBLICATIONS

Authorized Officer: Carola Fassnacht ISA/European Patent Office, International Search Report and Written Opinion; PCT/US2008/00419, May 15, 2009, 20 pages.

Primary Examiner — M. Phan
(74) Attorney, Agent, or Firm — Sunstein Kann Murphy & Timbers LLP

(57) ABSTRACT

A scrolling encoder encodes scrolling elements that are to be scrolled around all or a subset of the frames of a video stream or file with their movement in time and space controlled by a path to produce a video stream or file, without searching previous or subsequent frames of the video stream or file for reference blocks. The scrolling element can be an image, video, text or any combination thereof. The scrolling element is encoded using information about the contents of the scrolling element and information about a path the scrolling element is to take across a screen. The information about the contents of the scrolling element is obtained when the scrolling element is first introduced into a frame. The information about the path of the scrolling element is provided by an external component or is otherwise deduced. Optionally, the path information includes information about how the scrolling element is to change appearance. This information may be used to automatically generate error terms.

19 Claims, 7 Drawing Sheets

U.S. PATENT DOCUMENTS

| | | | |
|---|---|---|---|
| 6,389,075 B2 * | 5/2002 | Wang et al. | 375/240.16 |
| 6,771,704 B1 * | 8/2004 | Hannah | 375/240.16 |
| 6,956,899 B2 * | 10/2005 | Hall et al. | 375/240.03 |
| 7,224,731 B2 * | 5/2007 | Mehrotra | 375/240.16 |
| 2003/0035486 A1 * | 2/2003 | Kato et al. | 375/240.26 |
| 2005/0135385 A1 | 6/2005 | Jenkins et al. | 370/401 |
| 2010/0104021 A1 * | 4/2010 | Schmit | 375/240.24 |

FOREIGN PATENT DOCUMENTS

| | | |
|---|---|---|
| EP | 0 933 966 A1 | 8/1999 |
| EP | 1 051 039 A2 | 11/2000 |
| EP | 1 422 929 A2 | 5/2004 |
| EP | 1 725 044 A2 | 11/2006 |
| WO | WO 99/65243 | 12/1999 |
| WO | WO 2006/053305 A2 | 5/2006 |
| WO | WO 2006/105480 A1 | 10/2006 |

\* cited by examiner

SYSTEM AND METHOD FOR ENCODING SCROLLING RASTER IMAGES

CROSS-REFERENCE TO RELATED APPLICATIONS

U.S. patent applications entitled "Interactive Encoded Content System including Object Models for Viewing on a Remote Device" and "MPEG Objects and Systems and Methods for Using MPEG Objects," which are both assigned to the same assignee and filed contemporaneously herewith are related generally to the subject matter of the present application and are incorporated herein by reference in their entirety.

The present application claims priority from U.S. provisional application Ser. No. 60/884,772, filed Jan. 12, 2007, Ser. No. 60/884,744, filed Jan. 12, 2007, and Ser. No. 60/884,773, filed Jan. 12, 2007, the full disclosures of which are hereby incorporated herein by reference.

BACKGROUND

The present invention relates to video compressors and, more particularly, to video compressors that produce motion-vector based predictive picture blocks without searching previous or subsequent frames for reference blocks.

Uncompressed digital video signals for televisions, computer displays and the like can involve high data rates (bit rates). For example, a digitized typical National Television System Committee (NTSC) television signal has a data rate of about 165 megabits per second; an uncompressed high-definition television (HDTV) signal has an even higher data rate. To reduce these data rates, digital video signals are commonly compressed. Exemplary digital video compressing standards include Motion Picture Experts Group 1 (MPEG-1), MPEG-2, MPEG-4, Windows Media Video and QuickTime.

Compression techniques used with these and other standards exploit spatial and temporal redundancies typically present in uncompressed video signals to avoid sending redundant data. In other words, compression techniques take advantage of the fact that many parts of a typical video frame are identical or similar to other parts of the same frame or from frame to frame. To reduce temporal redundancy, these techniques send references to similar or identical, previously-sent portions of the video signal. Compression by reference to other portions of a video signal is commonly referred to as "motion-compensated inter-frame prediction." These techniques are, however, compute-intensive. Consequently, conventional hardware compressors are very expensive and software compressors are slow.

A video signal often consists of a series of pictures ("frames") displayed in rapid succession. A typical system displays between about 25 frames per second and about 75 frames per second. Each frame consists of a rectangular array of picture elements ("pixels"). For example, High Definition NTSC signal can contain 30 frames per second, each frame representing 1,080 rows ("lines") of pixels, with 1,920 pixels per line. These frames need not, however, be sent in the order in which they are to be displayed. That is, a compressor can send the frames slightly out of sequence. A decompressor generally includes a buffer to store received frames, and the decompressor rearranges the frames before displaying them. Sending the frames out of sequence can facilitate compressing and decompressing the video signal, as discussed below.

When attempting to compress a frame, a typical compressor operates on rectangular arrays of pixels, such as 16×16 pixel arrays ("macroblocks"), within the frame. For each macroblock, the compressor attempts to exploit temporal redundancy in the original video signal. Specifically, the compressor searches for a macroblock in one or more recently-sent frames whose contents are similar or identical to the macroblock that the compressor is attempting to compress. If the compressor finds one or more such macroblocks in one or more such frames (each such frame is referred to as a "reference frame"), the compressor replaces the macroblock that is being compressed with a reference to the found macroblock(s). Each found macroblock is referred to as a "reference macroblock."

If the compressor finds a reference macroblock in a reference frame, but the reference macroblock is not exactly identical to the macroblock that is being compressed, the compressor can include correction information (an "error term") that the decompressor can use to correct the macroblock. A reference to the reference macroblock, even if it includes the optional error term, requires fewer data bits than would be otherwise required to store the contents of the macroblock.

If the compressor cannot find a suitable reference macroblock, the compressor sends the contents of the macroblock that the compressor is attempting to compress. In addition, periodically the compressor unconditionally sends the contents of a full frame, without references to other frames.

The MPEG standards define an encoding methodology that is used when the contents of a macroblock are to be sent. This methodology includes a discrete cosine transform (DCT), quantization and entropy coding.

As noted, compression by reference to other macroblocks is referred to as motion-compensated inter-frame prediction. "Prediction" in this context refers to a process of ascertaining how a macroblock will appear, in relation to another, previously-sent one or more macroblocks. Sending this information to a matching decompressor enables that decompressor to regenerate a correct macroblock from information in the other frame(s).

These predictions are possible due to redundancies, from frame to frame, in most video content. For example, if a video signal depicts a moving object in front of a stationary background (relative to the frame boundaries), many of the macroblocks that depict the background may remain relatively constant from frame to frame. On the other hand, from frame to frame, a different set of macroblocks, i.e. macroblocks having different coordinates within the frame, depict the moving object. However, the contents of the macroblocks that depict the object may remain relatively constant from frame to frame; only the locations of these macroblocks within the frames change. Thus, macroblocks that represent background in a given frame can be compressed by referring to previously sent macroblocks, and macroblocks that represent the moving object can be compressed by referring to previously sent macroblocks that represent the object when it was located at a different location within the frame.

If a reference macroblock is not located in the same position within the reference frame as the macroblock that is being compressed is located within its frame, the compressor includes a "motion vector" in the encoded video signal. The motion vector specifies how the macroblock in the reference frame should be repositioned before it is inserted into a reconstructed frame by the decoder. Continuing the previous example, assume the object can be depicted by a 3×4 set of adjacent macroblocks, i.e., by 48×64 pixels. In addition, assume the same 3×4 set of macroblocks can be used to depict the object in a sequence of frames, except, because the object is moving within the frame, each macroblock that depicts the object appears at a different location within each of the frames. Thus, all the frames in the sequence can reference the same set of reference macroblocks to depict the object; however, in each of these compressed frames, different motion vectors are used, so the decompressor can ascertain where to depict the macroblocks in each of the reconstructed frames.

As noted, a reference frame can be one that is to be displayed before or after a frame that is being compressed. If the reference frame is to be displayed before the frame containing a macroblock that is being compressed, the compressed macroblock is said to be "forward predicted." On the other hand, if the reference frame is to be displayed after the frame containing the macroblock that is being compressed, the compressed macroblock is said to be "backward predicted."

If the compressor identifies two different reference frames, i.e., one before and the other one after the frame that is being compressed, each reference frame containing a macroblock that is similar to the macroblock that is being compressed, the compressor sends information about the macroblocks in both reference frames, and the decompressor essentially averages the two reference macroblocks. In this case, the compressed macroblock is said to be "bidirectionally predicted."

Prior-art video encoders produce compressed frames by referring to other frames. FIG. 1 is a block diagram of a prior-art video encoder 100 in operation. The video encoder 100 receives uncompressed video contents 102 (such as uncompressed video frames) and produces compressed video 104 (such as compressed video frames). The video encoder 100 includes a memory buffer (not shown), in which the video encoder stores recently encoded frames. While encoding a macroblock of a predicted frame, the video encoder 100 searches the previously encoded frames for macroblocks that contain similar or (ideally) identical contents, so the compressed video 104 can contain references (motion vectors) to similar or identical elements in the previously encoded frames. Searching the previously encoded frames for a suitable reference block that requires a small error term is compute-intensive. The compressed video 104 includes standard encoded frames, forward predicted macroblocks, backward predicted macroblocks, error terms, etc.

As noted, compression is a compute-intensive operation. For each macroblock that is to be compressed, the compressor typically searches a large number of macroblocks in many frames to find the most suitable reference macroblocks, i.e., the macroblocks that require a small error term and that yield good compression and good picture quality. The compressor chooses among the prediction modes described above (forward predicted, backward predicted or bidirectionally predicted), as well as other modes (not described here). The quality of the search algorithm and the amount of compute power available to the compressor influence the quality of the resulting decompressed video.

Some compressors require dedicated hardware. On the other hand, software compressors can be executed by general purpose processors, and some software compressors can operate as fast as, or faster than, real time. In either case, high-quality compression requires a sophisticated, and therefore expensive, platform.

SUMMARY OF THE INVENTION

An embodiment of the present invention provides a method for encoding a scrolling element so the scrolling element can be scrolled along a path of a scrolling region. The scrolling element itself may come from any of a variety of sources. It might have been captured photographically, rendered directly in a graphics plane, captured from any video or photographic source, or a blend of any of these sources, etc.

The scrolling element is encoded purely in a standalone block or macroblock. It need not be encoded as a part of a frame, but may be used to replace a block or macroblock in a pre-encoded or simultaneously encoded frame. It is built without searching for a reference frame or a reference macroblock.

Once the scrolling element is standard encoded and inserted into a reference frame, for at least one subsequent frame, a location for the scrolling element is calculated based on the rate of movement (speed) and path of the scrolling element. The scrolling element is then encoded using at least one motion vector based on the calculated location for the scrolling element.

If the element does not follow a linear path it may be necessary to encode an additional error prediction. However, since the bulk of the motion has been determined from the object's path it is not necessary to perform a motion search.

An X coordinate of the location, within the subsequent frame, of the scrolling element may be calculated according to the formula:

$$X = X(\text{previous}) + (\text{speed} \times \text{delta frame number}),$$

where "X(previous)" represents an X coordinate at which the scrolling element was displayed in the previously-encoded frame, "speed" represents a speed of the scrolling element and "delta frame number" represents a difference between the subsequent frame and the previously-encoded frame.

An X coordinate, within a previously-encoded frame, of a macroblock of the at least one motion vector may be calculated according to the formula:

$$X = X(\text{encode}) + (\text{speed} \times \text{delta time}),$$

where "X(encode)" represents an X coordinate of a macroblock in the subsequent frame, "speed" represents a speed of the scrolling element, and "delta time" represents a difference between a time associated with the subsequent frame and a time associated with the previously-encoded frame.

It should be recognized to one of ordinary skill in the art that this methodology can be expanded to multiple dimensions, such that the scrolling element may move in multiple dimensions (i.e. X and Y or X, Y, and Z).

The scrolling element may be at least a portion of an image, textual or a combination of text and an image.

Standard encoding the scrolling element may include encoding the scrolling element in at least one macroblock.

Optionally, the method for encoding a scrolling element also includes encoding video contents and combining the encoded video contents and the encoded scrolling element, such that the scrolling element and at least part of the encoded video contents occupy a common set of frames.

Optionally, the method for encoding a scrolling element includes standard encoding a second scrolling element, which is to be scrolled with a second speed and along a second path of a second scrolling region. For at least one subsequent frame, a second location for the second scrolling element is calculated, based on the second speed and the second path. The second scrolling element is encoded using at least one additional motion vector based on the calculated second location of the second scrolling element. The encoded scrolling element is combined with the second encoded scrolling element, such that the two scrolling elements occupy a common set of frames.

Optionally, the scrolling element and the second scrolling element are encoded along with video contents. The video contents are encoded, and the encoded video contents are combined with the two encoded scrolling elements, such that the two scrolling elements and at least part of the encoded video contents occupy a common set of frames. Additionally, more than two scrolling elements may be present within the same group of frames.

Another embodiment of the present invention provides a computer program product for encoding a scrolling element so the scrolling element can be scrolled along a path of a scrolling region, without searching for a reference frame or a reference macroblock. The computer program product includes a computer-readable medium on which computer instructions are stored. The computer instructions cause a computer to standard encode the scrolling element. For at least one subsequent frame, the computer instructions also cause the computer to calculate a location for the scrolling element based on the path. In addition, the computer instructions cause the computer to encode the scrolling element using at least one motion vector based on the calculated location for the scrolling element.

Yet another embodiment of the present invention provides a scrolling encoder for encoding a scrolling element so the scrolling element may be scrolled through a scrolling region, without searching for a reference frame or a reference macroblock. The scrolling encoder includes a standard encoder that has an input and an output. The scrolling encoder also includes a motion vector encoder that has an input and an output. The scrolling encoder further includes an encoding controller coupled to the input of the standard encoder and to the input of the motion vector encoder. The encoding controller is operative to selectively forward uncompressed video contents to the standard encoder and to the motion vector encoder. Once the scrolling element has been encoded by the standard encoder, for at least one subsequent frame, the scrolling element is motion vector encoded by the motion vector encoder based on at least one scrolling parameter related to the scrolling element. The scrolling encoder also includes a combiner coupled to the output of the standard encoder and to the output of the motion vector encoder.

The scrolling path is only bounded by the complexity of the motion vector encoder. Any motion path is possible even paths that transition multiple blocks between frames and traverse long distances, since only delta X and delta Y need to be calculated between frames, In prior art reference searching models, such paths are impossible to encode because of the computational complexity.

The at least one scrolling parameter may include information about a path that the scrolling element is to follow or information about a speed at which the scrolling element is to be scrolled or a combination of information about a path that the scrolling element is to follow and information about a speed at which the scrolling element is to be scrolled.

The at least one scrolling parameter may include information about a path that the scrolling element is to follow or information about a distance or displacement the scrolling element is to be scrolled or a combination of information about a path that the scrolling element is to follow and information about a distance or displacement at which the scrolling element is to be scrolled.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Definitions

Figure 1:
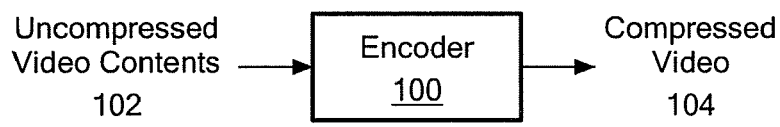
FIG. 1 is a block diagram of a prior-art video encoder.

Scrolling—As used herein the term scrolling shall mean that a new element is added to a video sequence and the new element changes display position between at least two frames wherein old data from the video sequence is replaced or combined with new data of the new element. The movement of the element can be linear i.e. (horizontal or vertical) or the movement may be along a non-linear path. The data that is replaced may be macroblock data, such that macroblock data from source S1 is replaced by macroblock data from source S2, where S2 is the scrolling element.

Frame—A still image in a sequence of pictures (still images), where the sequence collectively forms a video stream.

MPEG—A set of standards for lossy video and audio compression. The compression removes spatial redundancy within a video frame and temporal redundancy between video frames. The standards describe how frames are decoded.

Pixel—The smallest atomic picture element in a frame. A pixel is represented by a number of bits. For example, standard RGB format uses eight bits to represent a red (R) value, eight bits for green (G) and eight bits for blue (B), for a total of 24 bits. MPEG standards typically use a YUV color space that uses eight bits for luminance (Y) information and eight bits for each of two kinds of chrominance (U and V) information equivalent to color hue and color saturation, for a total of 24 bits.

Macroblock—A rectangular array of pixels, typically a 16×16 pixel array consisting of four 8×8 luminance blocks, with extra encoded information containing a number of 8×8 chrominance blocks and optionally a motion vector (described below).

I-frame—An MPEG frame encoded as a single image, with no reference to any past or future frames. A block of a frame tends to include spatial redundancy (repletion from place to place within the frame). Each block is transformed from the spatial domain to the frequency domain using a Discrete Cosine Transform (DCT) as part of a process to remove this spatial redundancy. An I-frame uses only transform coding, i.e., no references to past or future frames. Thus, an I-frame does not attempt to remove temporal redundancy (repetition from frame to frame).

Intracoding (also referred to as "standard encoding")—encoding a video signal (all or part of a frame) using only transform coding, without references to previous or subsequent frames. In other words, intracoding does not use forward predicted macroblocks, backward predicted macroblocks, bidirectionally predicted macroblocks, etc.

Intracoded macroblock—a macroblock that is coded with only information in the macroblock, i.e., without performing interframe prediction.

Interceded macroblock—a macroblock that is coded with information from another frame, i.e., an interceded macroblock is predicted, based on a macroblock in another frame, a motion vector and (if necessary) an error term.

P-frame—An MPEG frame encoded relative to a past reference frame. The reference frame can be an I-frame or another P-frame. Each macroblock in a P-frame can be encoded as either an I-macroblock or a P-macroblock. An I-macroblock is encoded the way a macroblock in an I-frame is encoded. A P-macroblock is encoded as a reference (motion vector) to a 16×16 area of the reference frame, plus an error term.

Motion vector—An (x,y) displacement that specifies the offset, within a reference frame, of a macroblock. The search for a good motion vector (one that yields a small error term and that requires a small number of bits) is at the heart of an MPEG video encoder. Motion vector search algorithms are highly compute-intensive.

B-frame—An MPEG frame encoded relative to a past reference frame, to a future reference frame (i.e., a frame that is to be displayed later in time than the B-frame) or to both a past and a future reference frame. Frames need not be sent in the same order as they are to be displayed. Thus, a future reference frame can be sent earlier (and displayed later) than a B-frame that refers to it.

Slice—A sequence of one or more macroblocks of a frame in raster-scan order. A slice can begin anywhere in a frame and may "wrap" from the end of one row of macroblocks to the beginning of the next successive row. A slice can encompass as much as the entire frame.

Path—A track of a scrolling element.

Encoding Scrolling Raster Images

A method and apparatus are disclosed for encoding a scrolling element in a video stream, without searching previous or subsequent frames of the video stream for reference blocks. The scrolling element can be an image, video, text or any portion or combination thereof. Scrolling elements are commonly used in video productions. For example, credits are often displayed at the end of a television program or motion picture by vertically scrolling the credits from top to bottom on a screen. Horizontal scrolling, sometimes referred to as "text crawling," is frequently used to display information, such as a late-breaking news story or a weather alert, in the lower portion of a television screen, without substantially interfering with the video contents displayed in the remainder of the screen. Television broadcasts of sporting events often display player statistics as crawling text.

A scrolling region can occupy any portion, or all, of a screen. As noted, a scrolling element can scroll horizontally or vertically through a scrolling region. In addition, a scrolling element can scroll across the screen along other angles, as well as along a straight line, a curved line, an irregular line or a discontiguous line (collectively referred to herein as a "path"). Regardless of the path along which a scrolling element is scrolled, the contents of the scrolling element generally remain constant as the scrolling element follows its path across the screen, although (as discussed below), the contents of the scrolling element may change from frame to frame.

A scrolling element follows its path at a speed. The speed of the scrolling element need not, however, be constant; that is, the speed can vary as the scrolling element follows the path. In addition, the scrolling element may stop along the path for a period of time and then continue along the path. Furthermore, the scrolling element may reverse direction along the path any number of times. Movement information about the scrolling element can be specified as a rate of change in position, angle or any other suitable measure. The rate may be expressed relative to time, frame number or any other suitable unit. Alternatively or in addition, the movement information can be specified as one or more times (or frame numbers) at which the scrolling element is to appear at one or more locations along the path, correlated with the locations along the path.

The geometry of a path, i.e., locations of points along the path, may be specified in any convenient way, such as by pixel coordinates within a frame or by angles and offsets (distances) relative to a common reference point. The location of each point along the path may be specified relative to a preceding or subsequent point along the path. Similarly, the movement of a scrolling element may be specified in any convenient way, such as by new x and y coordinates, changes (deltas) in x and y coordinates or a vector (angle and offset) relative to a location of the scrolling element in another macroblock or another frame. Units for the offset might be specified in terms of distances between pixel centers along the horizontal and along the vertical axes. Similarly, units for the offset could be given in fractional blocks, full blocks, fractional macroblocks and full macroblocks. The location of an object in a macroblock within a given macroblock in a present frame can be represented by the location of the object in a macroblock in a previous frame, plus an adjustment given by a vector (angle and offset). The path can also be computed by any mathematical algorithm. This can produce paths of various complexity.

Path and movement information about a scrolling element are collectively referred to as "path information."

In accordance with an embodiment of the present invention, a scrolling element is encoded using information about the contents of the scrolling element and path information about the scrolling element. The information about the contents of the scrolling element is obtained when the scrolling element is first introduced into a frame. The path information is provided by an external component or is calculated or otherwise deduced.

The contents information and the path information collectively provide sufficient information to encode the scrolling element as it scrolls through a scrolling region. Thus, the scrolling element can be encoded into a video signal without searching previous or subsequent frames for reference blocks. Consequently, much less compute power is required to encode the scrolling element than in the prior art, and the scrolling element can be encoded more quickly. Furthermore, the scrolling element can be decoded and rendered with higher quality, because in subsequent frames (i.e., after the scrolling element is encoded once in the video signal), the scrolled scrolling element can be encoded entirely through the use of motion vectors, i.e. without using error terms.

Two types of scrolling elements are described. One type does not change appearance as it moves along its path. The other type may change appearance as it moves along its path. The two types of scrolling elements may be used in combination in a scrolling region.

Once a scrolling element of the first type is on a screen, each successive frame (as displayed on the screen) contains the same information about the contents of the scrolling element as previous displayed flames; only the location of the scrolling element is different from frame to frame. The first time the scrolling element is encoded in a video stream, the scrolling element is intracoded. In subsequent frames, however, the scrolling element is encoded with motion vectors calculated from the content information and the path information. Generally, as a part of a scrolling region comes into view, that part is intracoded.

As noted, the second type of scrolling element may change appearance in a predictable way as it scrolls. For example, in a computer-generated animation, a basketball may spin at a constant rate as it travels across a screen. The spinning causes the image of the basketball to change from frame to frame in a way that can be calculated based on the spin rate and known information about the appearance of the basketball, i.e., shape, opacity, center of gravity and mass distribution of the basketball; location, size and shape of seams on the surface of the basketball; etc. Thus, the macroblock(s) that contain the image of the basketball appear in different relative locations on the screen from frame to frame, and the contents of the macroblocks may differ from frame to frame. The first time such a scrolling element is encoded in a video stream, the scrolling element is intracoded. In subsequent frames, however, the scrolling element is encoded with motion vectors calculated from the content information and the path information, as well as error terms (as needed) to modify the contents of the macroblock.

Figure 2:
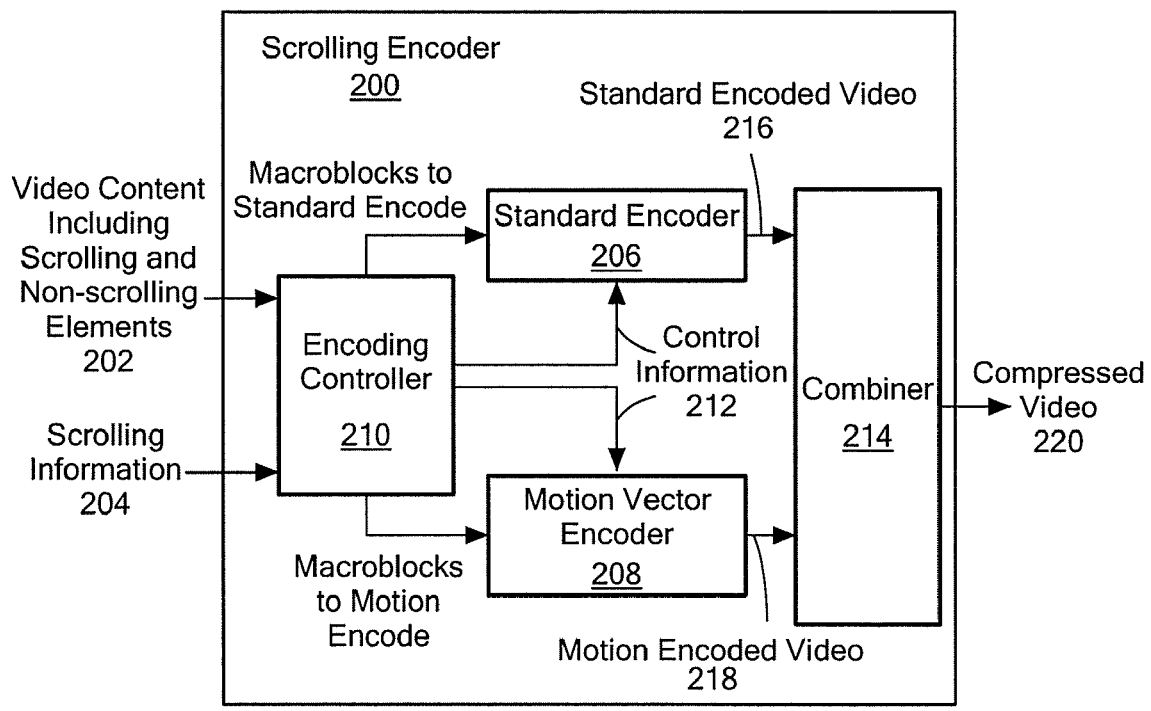
FIG. 2 is a block diagram of a scrolling encoder, in accordance with one embodiment of the present invention.

FIG. 2 is a block diagram of a scrolling encoder 200, in accordance with one embodiment of the present invention. The scrolling encoder 200 receives video content 202, as well as scrolling information 204. The video content includes scrolling and non-scrolling elements. The video content may originate from one or more sources and additionally, the video content may be compressed or uncompressed. The scrolling elements can originate from one video source and non-scrolling elements can originate from another source. In other embodiments, a single video source may contain both scrolling elements and non-scrolling elements. The scrolling and non-scrolling elements can be images, either naturally created via photography or art, or generated by computer algorithms, a series of images, text, shapes, or any combinations thereof. Images can, but need not, be photographs of real objects. They can also be computer-generated, such as bitmaps, icons, portions of animation frames, or any image source.

The scrolling information 204 contains path information, i.e., information that describes how the scrolling elements are to be scrolled. For example, the scrolling information 204 can include implicit or explicit spatial information about a track that a scrolling element is to follow and implicit and/or explicit timing or motion information about how the scrolling elements are to traverse the track. The scrolling information 204 can be provided by the same component that provides the video contents 202 or by another component. For example, the scrolling information 204 can be provided by a text generator.

Path information identifies positions within a set of frames where the scrolling element is to appear. For example, the path information can include a sequence of coordinates, vectors or any other suitable information. Alternatively, the path information can include information, such as a formula, by which the sequence of coordinates, vectors, etc. can be calculated. A formula for determining a location of a path or for determining movement of a scrolling element along a path may include a reference to a randomly generated number. Thus, although values determined by such a formula may not be predictable, they can be determined without searching previously-sent frames. The path information may be macroblock motion vectors and locations within a frame for each of the macroblocks.

For scrolling element of the second type, the path information also includes information about how the contents of the macroblocks are to be changed from frame to frame or for specific frames, such that error terms can be generated for the macroblocks. This information may include characterizations, tables, parameters, coefficients, formulas and the like, from which the error terms may be calculated. A formula for determining the appearance of a scrolling element may include a reference to a randomly generated number. Thus, although values determined by such a formula may not be predictable, they can be determined without searching previously-sent frames.

For some paths, such as a simple horizontal text crawl, the path information can include a beginning location and an ending location for the scroll, without necessarily providing additional location information for intermediate locations. In such a case, the scrolling element can be scrolled at a predetermined or specified rate between the beginning and the ending locations. It should be noted that the scroll need not necessarily begin or end at the boundary (edge) of a frame; that is, a scroll can begin or end at a location inward of the edges of the frame.

Furthermore, a path need not necessarily be contiguous. A path may be made up of two or more sub-paths. Each sub-path has its own beginning and ending location. However, the ending location of one sub-path need not necessarily be the same as or adjacent the beginning location of a next sub-path. Thus, there may be a spatial gap between sequential sub-paths. If so, the scrolling element "jumps" from the end of one sub-path to the beginning of the next sub-path. This can be used for effects such as having the scrolling elements appear to pass behind other elements, which may be stationary or scrolling.

As noted, the scrolling information 204 can also include information about a speed with which the scrolling element is to follow the path or the time or number of frames it is to take for the scrolling element to traverse the path. The speed of the scrolling element need not be constant; that is, the speed can vary as the scrolling element follows the path. In addition, the scrolling element may stop along the path for a period of time, and the scrolling element may reverse direction along the path. The speed information can be specified as a rate (for example, relative to time or frame number). Alternatively, the speed information can be specified as one or more times (or frame numbers) at which the scrolling element is to appear at one or more locations along the path, correlated with the locations along the path.

The information about how to generate the error terms may be correlated with the information about the track the scrolling element is to traverse, as well as with the speed or motion information.

The scrolling encoder 200 includes a standard encoder 206, a motion vector encoder 208 and an encoding controller 210. The standard encoder 206 may encode or re-encode video content into a predetermined format. For example, the MPEG format, or a variation of MPEG using a Fourier-based transform to block encode an image. The encoding controller 210 forwards the video content 202 to the standard encoder 206 or to the motion vector encoder 208, as appropriate. For example, when a scrolling element is first introduced and the scrolling element has not yet been encoded, the encoding controller 210 forwards one or more blocks, such as MPEG macroblocks, representing the scrolling element to the standard encoder 206. However, for encoding the scrolling element in subsequent frames, the encoding controller 210 forwards blocks or other information to the motion vector encoder 208.

In certain embodiments, the encoding controller recognizes the format of the video content and may cause the standard encoder and the motion vector encoder to re-encode the video content into a preferable format for compositing the scrolling and non-scrolling elements together. For example, if the non-scrolling element is video as opposed to a still image, the video content may be re-encoded so that each flame is an MPEG P-type frame. Thus, both intracoded and interceded information may co-exist within the same frame. The process of re-encoding (i.e. grooming) is explained in U.S. patent application entitled Interactive Encoded Content System including Object Models for Viewing on a Remote Device filed concurrently herewith and assigned to the same assignee, which is incorporated herein by reference in its entirety. The encoding controller may also simply cause already encoded content to be directed to combiner 214, without decoding or re-encoding the encoded content. For example, a video sequence, which is encoded as MPEG video and which will have scrolling matter may be sent directly to the combiner.

It should be noted that a scrolling element may be a portion of a graphic that is to be scrolled. For example, assume the text "Weather alert: High wind warning" is to be scrolled at a constant rate, right to left, within a horizontal, linear scroll region. When the text crawl begins, a portion (or possibly all) of the "W" in "Weather" is introduced into the right-most portion of the scroll region. The amount of the "W" that is introduced in the first frame depends at least in part on the speed with which the text is to be scrolled. In subsequent frames, additional portions of the "W" are introduced into the right-most portion of the scroll region, followed in successive frames by successive portions (or all) of the "e", "a", etc. In successive frames, as these portions of the text are introduced into the right-most portion of the scroll region, previously displayed text is shifted to the left in the scroll region. Eventually, each portion of the scrolling text reaches the left edge of the scroll region, after which it is no longer displayed.

The encoding controller 210 sends control information 212 to the standard encoder 206 and to the motion vector encoder 208. For example, the encoding controller 210 calculates the location of the scrolling element for subsequent frames, based on the path and speed of the scrolling element, as well as error terms (if necessary) and sends this information to the motion vector encoder 208. The motion vector encoder 208 encodes the scrolling element, including generating a motion vector produced from the calculated location (and optional error terms) of the scrolling element, relative to a calculated location of the scrolling element in a previously encoded frame. Advantageously, no portion of the encoder platform 300 needs to search previously encoded frames to find an appropriate reference frame or reference macroblock, because: (1) the contents of portions of subsequent frames are generally identical to portions of previously encoded frames or error terms describing how to alter the macroblocks can be generated from the path information and (2) where (within a previously encoded frame) a particular portion of the scrolling appeared can be calculated from the path and speed of the scroll.

For example, when the first portion of the "W" is introduced into the scrolling region, this portion of the "W" is standard encoded. In subsequent frames, this portion of the "W" is motion-vector encoded. The position within each subsequent frame of this portion of the "W" is calculated based on the path (including speed) of the scroll. Thus, in each subsequent frame, this portion of the "W" appears to the left of where it appeared in the immediately preceding frame. Consequently, for a given frame, when a macroblock containing this portion of the "W" is being encoded, the X coordinate of the macroblock can be calculated from the path and speed of the scroll and the frame number.

For example, for a purely horizontal scroll at a uniform speed, the X coordinate of the portion of the "W" within a frame can be calculated according to a formula:
X=X(previous)+(speed×delta frame number) (wherein speed would be negative for right to left scrolling), where "X(previous)" represents an X coordinate at which the scrolling element was displayed in a previous frame, "speed" represents a speed of the scrolling element and "delta frame number" represents a difference between the frame and the previous frame.

More generally, a motion vector formula may be used to calculate the location of a scrolling element, such as in:

$$X = X(\text{previous}) + \text{calcObjectXOffset}(\text{time or frame number})$$

$$Y = Y(\text{previous}) + \text{calcObjectYOffset}(\text{time or frame number})$$

Similarly, the position at which this portion of the "W" appeared in previously encoded frames can be calculated based on the path of the scroll and the frame numbers. For example, when encoding this portion of the "W" for a given frame, the portion of the "W" is likely to have appeared in the immediately preceding frame, as well as in some earlier frames. To encode this portion of the "W," the motion vector encoder 208 selects a previous frame in which this portion of the "W" appeared. This choice can be arbitrary, because the appearance of the portion of the "W" generally does not change from frame to frame.

Assume the immediately preceding frame is selected. (Thus, the immediately preceding frame is the reference frame.) The location of this portion of the "W" within the reference frame (i.e., the location of the reference macroblock) is calculated based on the path and speed of the scroll. In this example, the scroll is horizontal; thus the Y coordinate of the reference macroblock is the same as the Y coordinate of the macroblock that is being encoded.

The X coordinate of the reference macroblock is greater (assuming the pixel coordinate origin is in the upper left corner of the frame) than the X coordinate of the macroblock that is being encoded by the displacement of the portion of the "W" between the frame that is being encoded and the reference frame. The time interval between successive frames is fixed and known, based on the type of video stream being produced. For example, the time between successive NTSC frames is essentially 1/30 second. Thus, if X(encode) represents the X coordinate of the macroblock that is being encoded, R(horizontal) represents the horizontal scroll rate in pixels per second, T represents the time (in seconds) between the reference frame and the frame that is being encoded and X(reference) represents the X coordinate of the reference macroblock, X(reference) can be calculated according to the following formula:

$$X(\text{reference}) = X(\text{encode}) + R(\text{horizontal}) \times T$$

Similar formulas can be used for vertical scrolling or scrolling along other paths, including curved paths. Using appropriate formulas, the motion vector encoder 208 calculates an appropriate motion vector, rather than searching previously encoded frames for a reference macroblock. Thus, the encoder platform 300 requires fewer computational resources to produce the encoded video 306 than a prior-art encoder.

Expanding the previous example, if the characters of the scrolling text change appearance over time or as the text scrolls (for example, if the text changes color or transparency or if the text "jiggles" within the scroll region), and these changes can be characterized by a formula, table or other mechanism, this characterization may be used to generate error terms for encoding the scrolling text.

Although the calculations in these examples have been described in terms of x and y coordinates, as noted, vectors or other constructs may be used to represent and calculate locations, movement, paths, speeds, etc. In one embodiment, a reference object is treated as being at the origin of a Cartesian plane. The vector of the motion for each successive non-reference frame can deal with the motion of the object in terms of distance and trajectory, not necessarily as a function of speed and elapsed time. This may be represented by a standard slope-intercept equation.

In fact, the path need not be calculated at all. Any data source for coordinates and time periods can be used. Any combinations of calculated paths, predetermined paths, and real-time data paths may also be used. For example, path information may include predetermined motion vectors along with corresponding macroblock locations. Thus, the combiner 214 can readily replace the macroblock data for the non-scrolling element with the motion vectors without the need to calculate motion vectors in real-time.

A combiner 214 combines multiple sources of video content together. The combiner may receive scrolling and non-scrolling elements. For exemplary purposes, the combiner receives one scrolling element and one non-scrolling element, although it should be recognized that the combiner may receive more than one scrolling element. The combiner replaces and/or combines video data blocks (if MPEG encoding is used macroblocks are replaced or combined in-part) within the non-scrolling content with data blocks from the scrolling content and formats the data into an appropriate compressed video stream, such as an MPEG video stream. If the encoding is MPEG encoding, the resulting video frames will be formatted as P-type frames. The combiner will combine content by replacing macroblocks from the non-scrolling element with macroblocks of the scrolling element. In certain circumstances, where the scrolling element falls only within part of a macroblock, the portion of the macroblock containing the non-scrolling macroblock that does not overlap with the non-scrolling element will be combined with the non-scrolling element to form a macroblock.

In addition, the combiner will maintain in memory the macroblocks that were removed from the non-scrolling element, for insertion into subsequent frames when the scrolling element has moved further along its path. Thus, if the non-scrolling object is static and has a macroblock that is intracoded and the macroblock lies along the path that is replaced by a motion vector for the scrolling object, the intracoded macroblock from the non-scrolling element will be stored in memory and used for that same macroblock location when the scrolling object is no longer present at that macroblock location. In the reverse situation, wherein the non-scrolling element is video and the scrolling object is static content, the combiner discard the macroblock data for the non-scrolling element, since subsequent frame information exists.

Figure 2A:
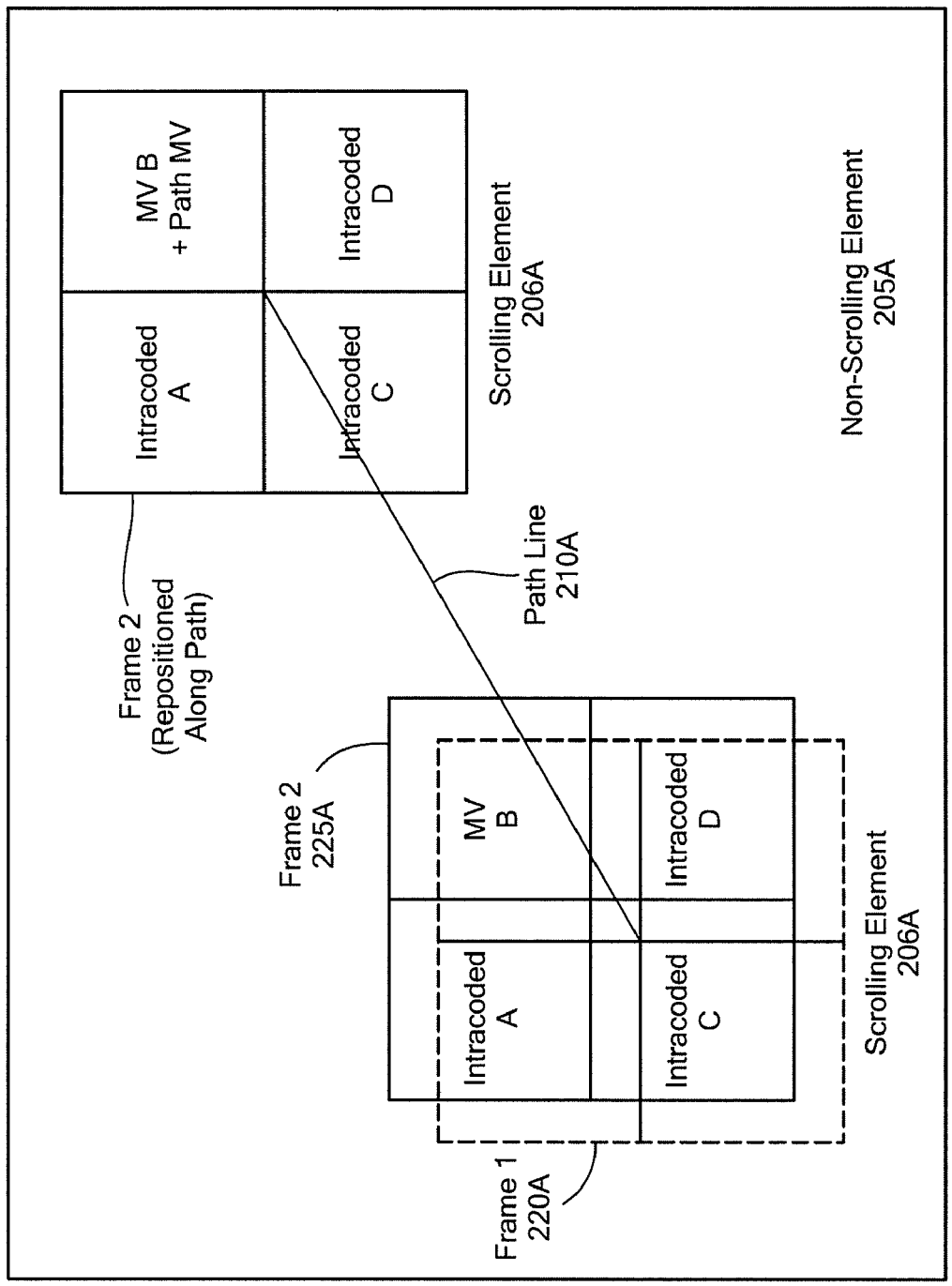
FIG. 2A depicts the insertion of a scrolling video element into a non-scrolling element.

If the scrolling element is a video sequence, for example an MPEG sequence of a spinning ball, all intracoded block data will be moved along the path 210A, while intercoded data (i.e. motion vectors) will be determined. The new motion vectors will be determined based upon the old motion vectors in combination with the motion vectors that determine the path. FIG. 2A shows an example of scrolling element that is a video sequence positioned within a non-scrolling element 205A. The scrolling element 206A for this example includes four data blocks (A,B,C,D). The scrolling element includes a series of video frames. As shown in FIG. 2A two frames are displayed although the scrolling element could include N frames. Frame 1 220A is displayed at time T1 and frame 2 225A is displayed at time T2. If the scrolling element did not move, the motion vector (MV) of data block B could be used for determining the data values in block B. However, since Frame 2 moves along the path as shown, the motion vector for block B needs to be recalculated to account for the path vector. Thus, the motion vector of block B of Frame 2 225A is based upon the originally present motion vector and the path vector. The mathematical algorithm for combining two vectors together to form a new resultant vector is know to those of ordinary skill in the art. The remaining blocks A, C, and D of Frame 2 that were intracoded are simply placed into the proper macroblock location within the data sequence without having to alter the data. As previously mentioned the data blocks that are removed from the non-scrolling element that are replaced by data blocks of the scrolling element are stored into a memory location and are re-inserted into a frame in the video sequence once the scrolling element has moved from that block location The combiner may receive standard encoded video 216 (produced by the standard encoder 206) and motion encoded video 218 (produced by the motion vector encoder 208) to produce the compressed video 220. Structure and operation of the combiner 214 are disclosed in a U.S. Provisional Patent Application No. 60/884,773 titled "Interactive Encoded Content System including Object Models for Viewing on a Remote Device," filed Jan. 12, 2007, the contents of which are hereby incorporated by reference. The compressed video output 220 may be "groomed" as explained in U.S. Provisional Patent Application 60/884,773 and then combined ("stitched") with other video signals. For example a markup language page may be created as in an authoring environment that includes reference to the compressed video and other video sources that upon further combination produces a video signal that is distributed to viewers or that is recorded, as discussed in the above-identified provisional patent application.

An "MPEG object" is an object-oriented data structure that may be used in the creation of interactive MPEG video stream. MPEG objects are disclosed in U.S. Provisional Patent Application 60/884,744 titled "MPEG Objects and Systems and Methods for Using MPEG Objects,", filed Jan. 12, 2007, the contents of which are hereby incorporated by reference. An MPEG object may have a position and/or appearance property, which changes with time. Such properties may be implemented using scrolling images, as disclosed herein.

Figure 3:
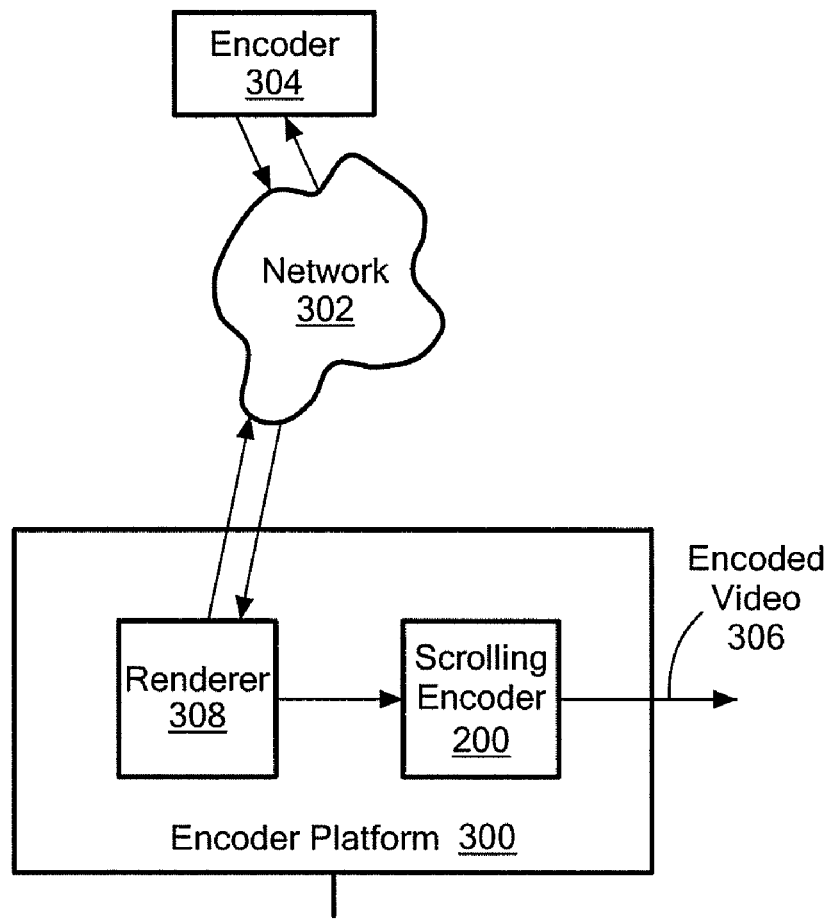
FIG. 3 is a block diagram of an exemplary environment in which one embodiment of the present invention can be used.

FIG. 3 is a block diagram of an exemplary environment in which one embodiment of the present invention can be used showing one dimensional text scrolling. This example is provided for simplicity and ease of understanding and it should be understood by one of ordinary skill in the art that multi dimensional scrolling of one or more scrolling elements are possible. Additionally, this example presumes that the text is not already encoded and that the encoder platform determines both intracoded and intercoded for the text. The disclosed system can provide an encoded video stream that contains scrolling text. In this environment, an encoder platform 300 receives text over a network 302 from a server 304. The encoder platform 300 produces encoded video 306 that includes the text as one or more scrolling elements. The encoder platform 300 can fetch the text from the server 304, or the server 304 can "push" the text to the encoder platform 300. Other techniques, such as web feeds, can also be used to transfer the text to the encoder platform 300.

The server 304 can be any source of text, such as a real-time source of text. For example, the server 304 can provide text related to news, stocks or weather. In one example, the server 304 obtains marine weather forecasts available in text form via the Internet from the National Oceanic and Atmospheric Administration's (NOAA) National Weather Service. In other examples, the server 304 obtains or generates text, such as stock prices, sports scores, news, aviation information (such as visibility, ceiling height, barometric pressure, wind speed and direction), etc.

The encoded video 306 can be used in an over-the-air or cable television broadcast, private television display, web server or other consumer of video signals. The scrolling text can occupy any amount of a screen. The encoded video 306, with the scrolling text, or any portion thereof can be displayed alone, or it can be superimposed or otherwise included with other video material.

The network 302 can be an Internet protocol (IP) network, such as the Internet, an intranet, a public wide area network (WAN) or any other suitable connection which is able to transfer digital information between the server 304 and the encoder platform 300.

The encoder platform 300 includes a renderer 308 and the scrolling encoder 200 described above. The renderer 308 converts text into uncompressed video that includes one or more scrolling elements. The renderer 308 also generates path information, such as track, speed and (optionally) image change information. For example, the renderer 308 can generate scrolling information that describes scrolling marine weather forecast text, from right to left, across the bottom 10% of a screen, such that each scrolling element requires six seconds to scroll the entire width of the screen. The scrolling information can be generated from preprogrammed data stored by the renderer 308 or entered via a user interface (not shown). The renderer 308 sends the uncompressed video and the scrolling information to the scrolling encoder 200. The scrolling encoder 200 encodes the scrolling element(s) and produces the encoded video 306, which can be then be included in a television broadcast or other video system.

Figure 4:
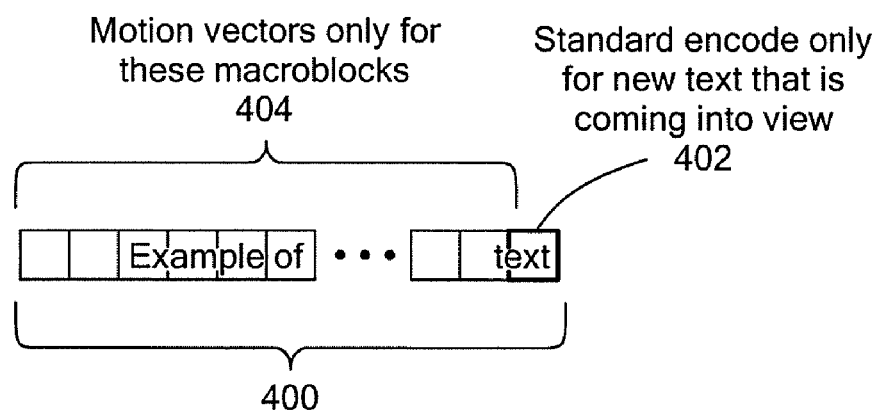
FIG. 4 depicts an example of horizontally scrolling text, in accordance with one embodiment of the present invention.

An example of horizontally scrolling text is depicted in FIG. 4. In this example, the text scrolls from right to left across a screen within a scrolling region 400. That is, the text appears at the right edge of the scrolling region 400 and gradually moves across the scrolling region 400 from right to left. The text disappears when it reaches the left edge of the scrolling region 400. In the example shown in FIG. 4, the scrolling region 400 includes one row of macroblocks. However, the scrolling region 400 can occupy one or more rows of macroblocks. In addition, the macroblock row(s) need not extend all the way to the edge(s) of the frame. This example also presumes that the text data has not already been compressed.

Encoding of the text is divided into two portions: (1) as new text enters the scrolling region 400, the new text is standard encoded; and (2) as the text scrolls across the scrolling region 400, the scrolling text is encoded using motion vectors (and, optionally, error terms). However, unlike prior art encoders, the scrolling encoder 200 need not search for appropriate reference frames. Instead, reference frames are known to lie within the scrolling region 400. If error terms are required, they are generated from a priori knowledge of how the scrolling elements change from frame to frame. The location of an appropriate reference frame and reference macroblock can be calculated based on the rate of scroll of the text within the scrolling region 400 and the geometry (shape) of the scrolling region 400. (The scrolling region 400 shown in FIG. 4 is straight. However, as noted, a scrolling region can have any shape.)

Thus, in the example shown in FIG. 4, the right-most macroblock 402 is standard encoded as new text enters the macroblock 402. In situations where the scrolling region 400 contains more than one (vertically stacked) row of macroblocks, or where text initially appears spread across more than one horizontally adjacent macroblock, more than one macroblock is standard encoded. In other words, the number of macroblocks that are required to display new text are standard encoded. Standard encoding provides the highest level of detail and best video quality, when the encoded video 306 is decoded. As used herein, the term standard encoding means intraframe encoding and can apply to any block-based compression encoding technique.

The remaining macroblocks 404 in the scrolling region 400 are motion vector encoded (with optional error terms) with reference to previously encoded reference blocks in the scrolling region 400. The reference blocks should prove to be ideal. That is, it should be possible to encode the remaining macroblocks 404 with essentially no error terms, assuming the appearance of the text does not change as the text scrolls through the scrolling region 400. If the text does change as the text scrolls, appropriate error terms can be calculated, as discussed herein. Consequently, the high-quality image (that was encoded in the standard encoded macroblock(s) 402) is retained in the remaining macroblocks 404; however, the remaining macroblocks 404 require much less data to encode. Periodically or occasionally, an entire frame may be standard encoded to enable a receiver to begin decompressing a scrolling region (or to recover from an error) part way through a video sequence.

Figure 5:
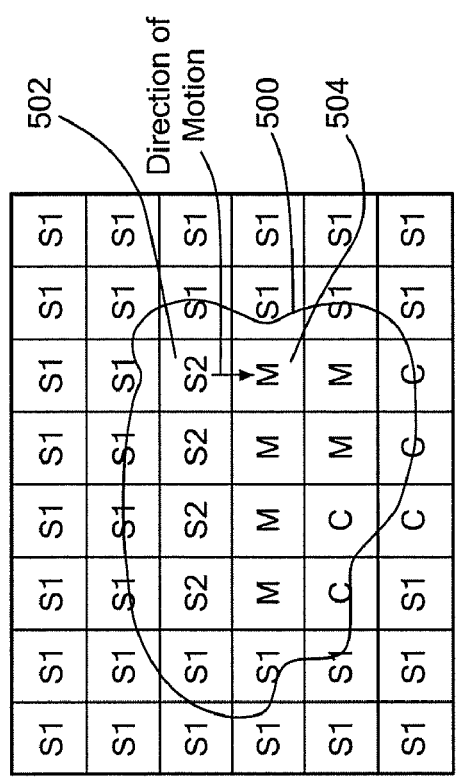
FIG. 5 depicts an example of vertically scrolling a scrolling element, in accordance with one embodiment of the present invention.

FIG. 5 illustrates an example of vertically scrolling a scrolling element within a scrolling region 500. The scrolling region 500 includes a number of macroblocks S2, M, etc. The scrolling element scrolls vertically, from top to bottom, within the scrolling region 500. Thus, as indicated by the "Direction of Motion" arrow, the image displayed in macroblock 502 in one frame will be displayed in an adjacent (lower) macroblock 504 in the next frame.

The macroblocks are labeled to indicate the type of encoding required. Macroblocks labeled "S1" are standard encoded, because these blocks are not entirely associated with the scrolling region 500 or with any previous display of the scrolling element. Thus, visual information not associated with the scrolling region 500 is included in at least a part of each S1 macroblock. Thus, the S1 macroblocks contain contents that may not have been previously displayed within the scrolling region 500. (Of course, if some or all of the S1 macroblocks contain contents that have been previously displayed in other parts of the frame, these macroblocks may be motion vector encoded.)

Scrolling elements are introduced in the top of the scrolling region 500 and scroll down. Macroblocks labeled "S2" are standard encoded, because these macroblocks represent new scrolling element data that is to be displayed and that has not been previously displayed in the scrolling region 500.

Macroblocks labeled "M" are fully occupied by some portion of the scrolling element that was previously displayed. Thus, these macroblocks M1 can be motion vector encoded.

Macroblocks labeled "C" contain portions of the scrolling element that have been previously displayed, as well as portions of the background. These C macroblocks can be encoded with a combination of standard and motion vector encoding. (A macroblock can be subdivided into blocks, and each of the blocks can be differently encoded.)

Encoding the M and some of the C macroblocks with motion vectors results in a bit stream that is smaller than if standard encoding had been used to encode all the macroblocks of the scrolling region 500.

Figure 6:
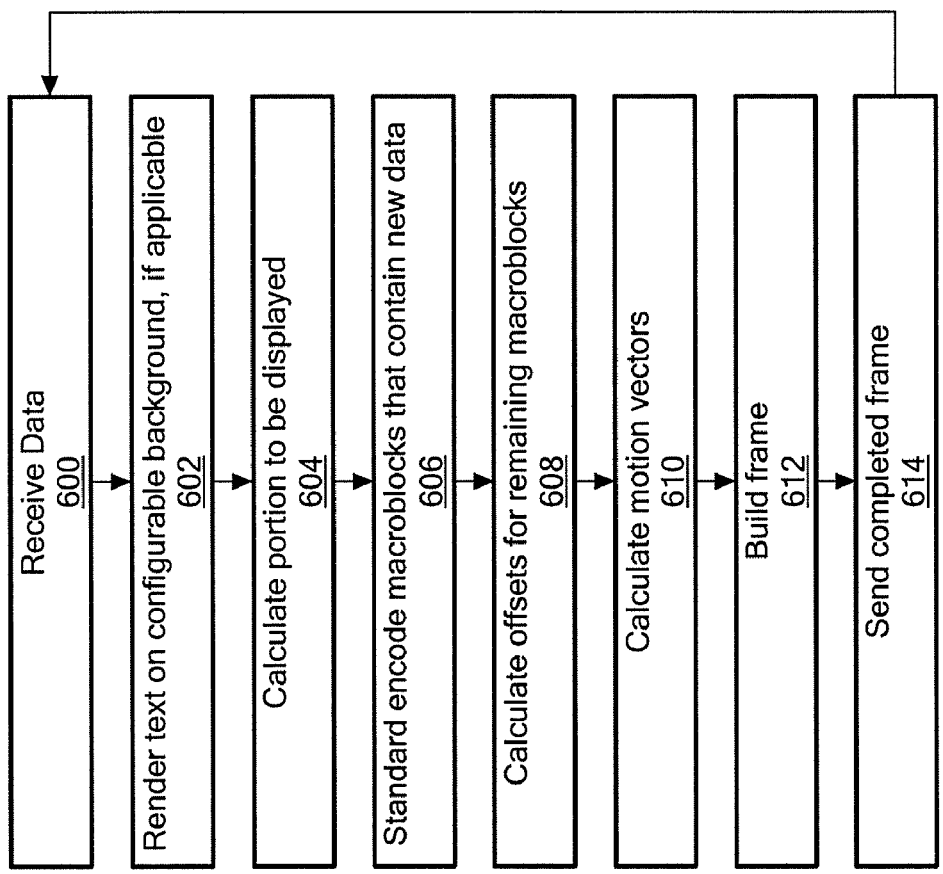
FIG. 6 contains a flowchart describing an encoding process, according to one embodiment of the present invention.

FIG. 6 contains a flowchart describing an encoding process, according to one embodiment of the present invention. At 600, data to be scrolled is received. If the data is text, at 602 the text is rendered in a font, size, color, boldness, background color, etc., as specified by control information received along with the data or as otherwise specified. Based on the shape of the scrolling region and on the scrolling speed, the portion of the scrolling element that is to be displayed is calculated at 604. For example, if the scrolling element is just beginning to scroll through the scrolling region, only a beginning portion of the scrolling element is to be displayed. Similarly, if a text passage is to be scrolled through the scrolling region, and the text passage is longer than the scrolling region, only a portion of the text passage is displayed at a time.

Macroblocks that contain new data are standard encoded at 606. Offsets required to encode the remaining macroblocks are calculated at 608. At 610, motion vectors are calculated from these offsets. At 612, once all the data has been encoded, a frame is built from the encoded data. The encoded frame is transmitted at 614, after which control returns to 600 to receive more data. If no more data is received, the process ends.

Figure 7:
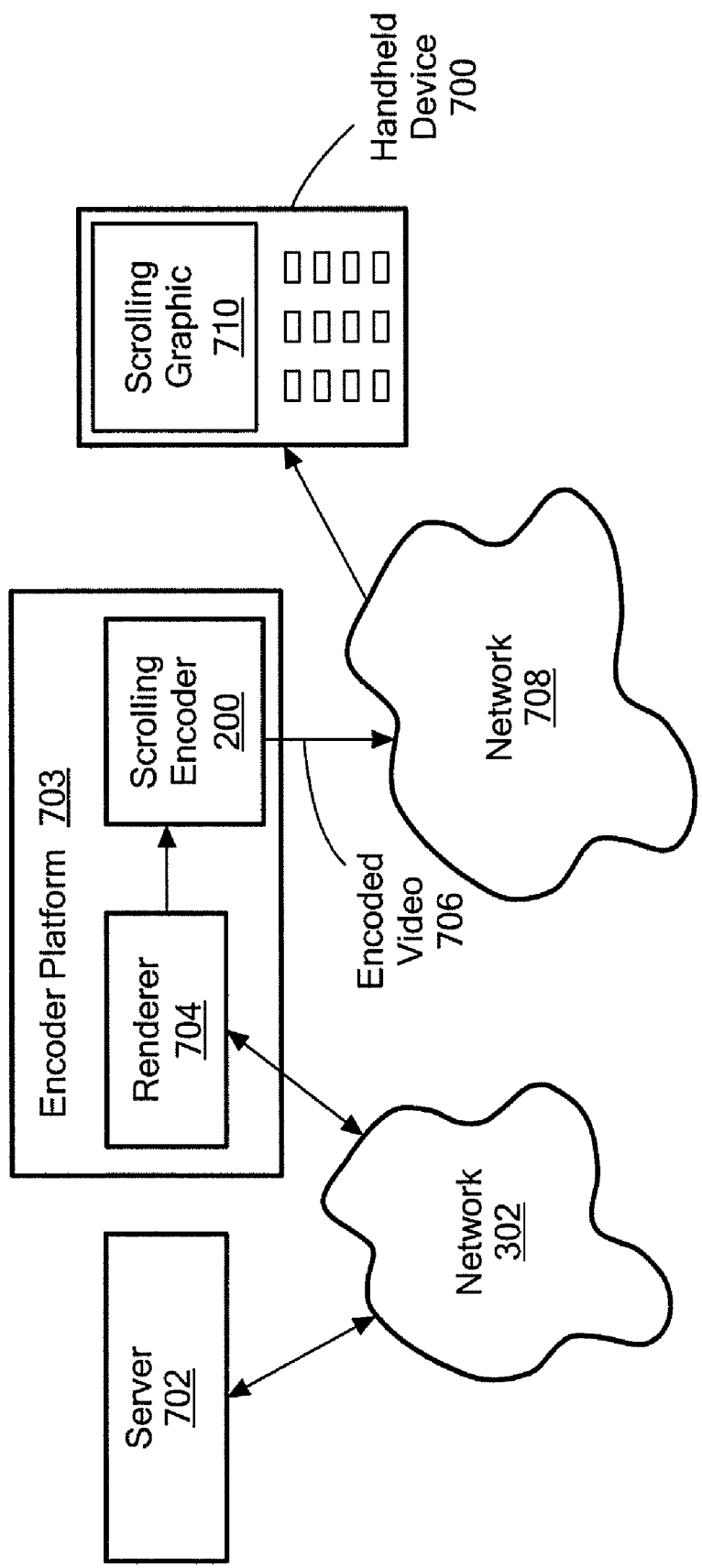
FIG. 7 is a block diagram of an exemplary environment in which another embodiment of the present invention can be used.

FIG. 7 is a block diagram of an exemplary environment in which another embodiment of the present invention can be used to provide scrolling video, text, or other graphics to a handheld device 700. As described above with reference to FIG. 3, a server 702 provides video content, text, or graphic images that are compressed or uncompressed via a network 302 to an encoder platform 300. Although only a single server is shown in the present figure, the information sources (video content, text, or graphic images) may originate from any one of a number of locations (servers, content providers, broadcast providers etc.) The video, text or graphics can be stored by the server 702, or the server 702 can obtain the video, text, or graphics from another source. An encoder platform 703 includes a renderer 704 and a scrolling encoder 200. Operation of the renderer 704 is similar to the operation of the renderer 308 described with reference to FIG. 3; however, the renderer 704 can also operate with non-textual data. The encoder platform 703 sends encoded video 706, via a communication network 708, to the handheld device 700, and the handheld device 700 decodes and displays the encoded video including the scrolling and/or text on a screen 710. The scrolling and/or text can, but need not, occupy the entire screen 710.

Figure 8:
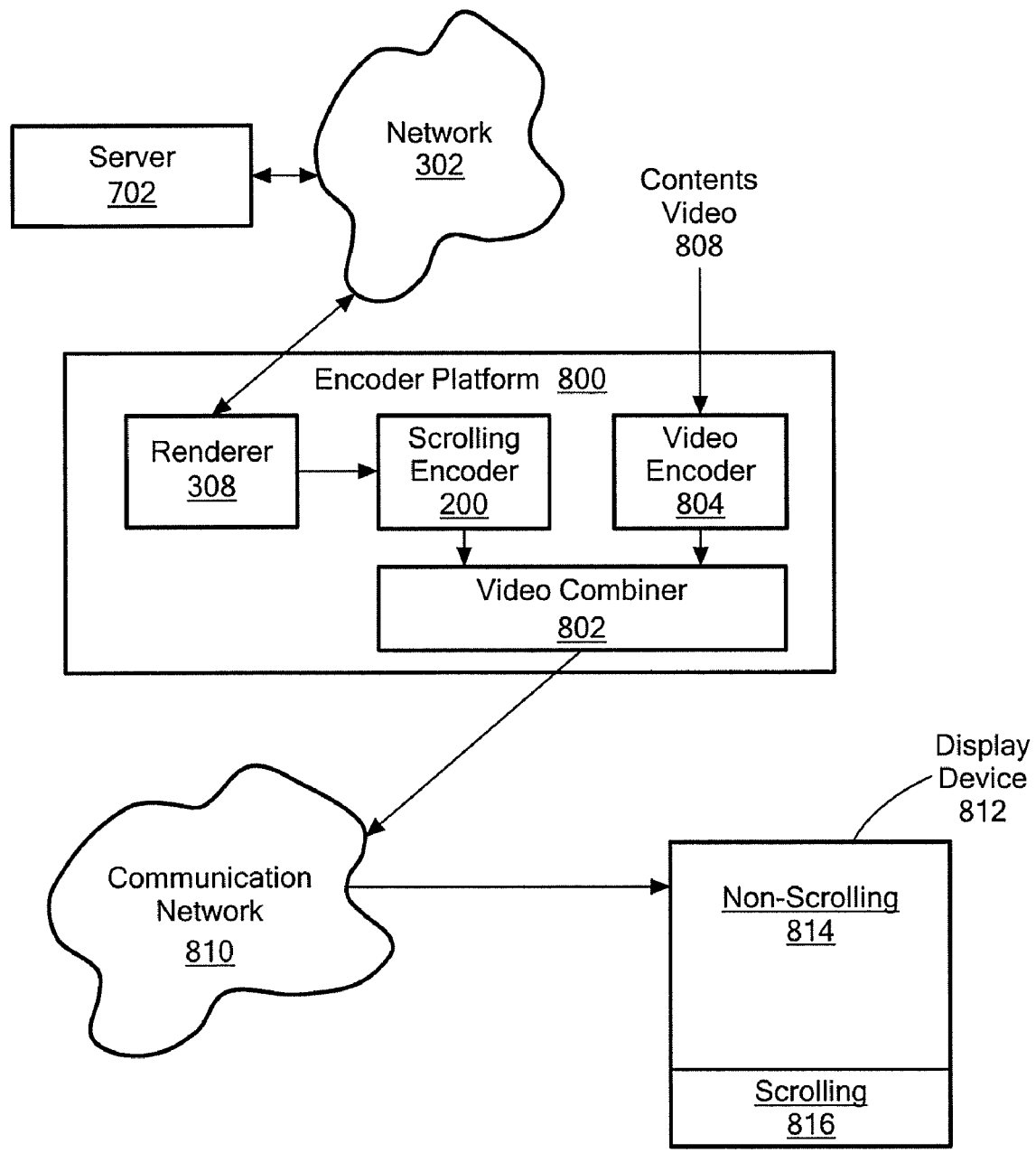
FIG. 8 is a block diagram of an exemplary environment in which yet another embodiment of the present invention can be used.

FIG. 8 is a block diagram of an exemplary environment in which yet another embodiment of the present invention can be used to provide scrolling video, text, or graphics ("scrolling elements") to a video broadcasting system. In this example, the scrolling elements are combined with one or more other video streams, such that the scrolling elements are displayed along with the other video stream(s). As discussed above, a server 702 provides the video, text or graphics via a network 302 to an encoder platform 800. The encoder platform 800 includes a scrolling encoder 200, as discussed above. The output from the scrolling encoder 200 is provided to a video signal combiner 802. In the event, that the scrolling element is not static (i.e. text or a single image), but rather is a video stream, the video stream will be groomed to place the content into the proper format. For example, the frames of the video stream may be groomed, so that each frame is an MPEG P-type frame. Additionally, the non-scrolling element, if it is a video, will also be groomed to format the frames as P-type frames.

The video signal combiner 802 also receives compressed video from a video encoder 804. This video encoder 804 receives video contents 808 from another source, such as a television network, satellite broadcast, computer, DVD player or any other source of locally stored, locally generated, previously recorded or real-time video. The video signal combiner 802 combines the scrolling elements with the video 808, such that scrolling elements are superimposed on the video 808. The encoder platform 800 sends the combined video signal from the video combiner 802, via a communication network 810, to one or more display devices 812. Exemplary display devices 812 include television sets, computers and portable electronic devices (such as cellular telephones) with appropriate screens. The communication network 810 can be an over-the-air broadcast system, cable television system, satellite system or the like. The display device 812 displays the video 808 in one portion 814 of a screen and the scrolling elements in another portion 816 of the screen.

Figure 9:
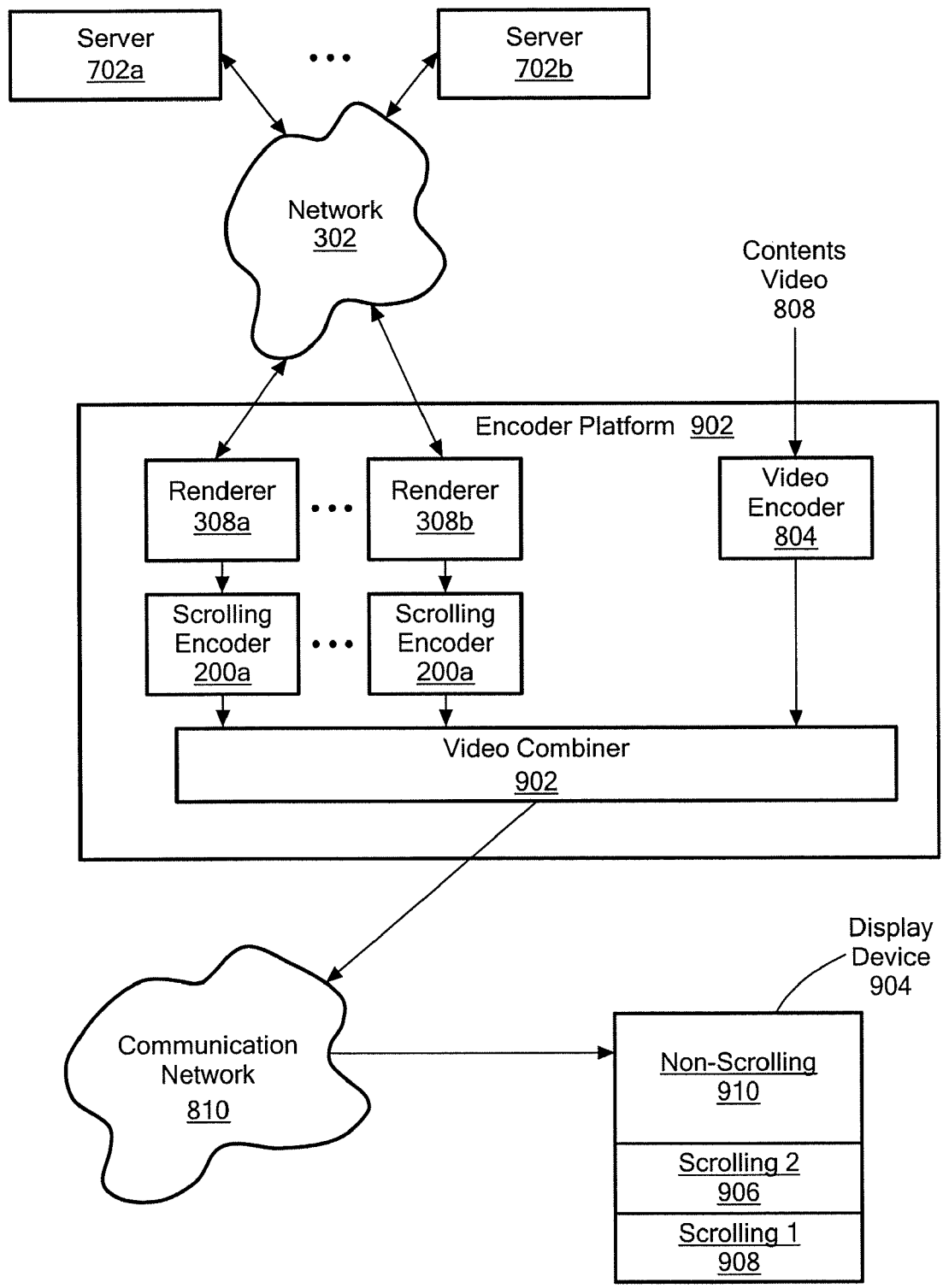
FIG. 9 is a block diagram of an exemplary environment, in which more than one independent scrolling region can be simultaneously displayed on a single screen, in accordance with another embodiment of the present invention.

More than one independent scrolling region can be simultaneously displayed on a single screen, with or without non-scrolled video content. For example, as shown in FIG. 9, two servers 702a and 702b provide video, text and/or graphics via a network 302 to an encoder platform 900. The encoder platform 900 includes two or more renderers 308a and 308b and two or more scrolling encoders 200a and 200b. As in the example shown in FIG. 8, the encoder platform 900 also receives video content 808 and encodes these video contents with a video encoder 804. A combiner 902 combines the outputs from the scrolling encoders 200a-b and from the video encoder 804. This combined video is sent via a communications network 810 to one or more display devices 904.

Each of the video, text or graphics provided by one of the servers 702a or 702b is displayed in a separate scrolling region 906 or 908 of the display device 904. The scrolling regions may overlap and priority may be assigned to each scrolling element. The video 812 is displayed in a non-scrolling region 910 of the display device 904. The two scrolling regions 906 and 908 can have different sizes, different geometries, different scroll rates, etc. For example, one of the scrolling regions 906 may display a slow moving, left-to-right text crawl of late-breaking news, and the other scrolling region 908 may display a fast moving, top-to-bottom scroll of stock prices. Although the example shown in FIG. 9 has two scrolling regions, any number of scrolling regions can be used. In addition, the scrolling regions 906-908 can, but need not, extend from one edge of the display device 904 to the other edge of the device, and the scrolling regions can have any shape and need not be contiguous. Furthermore, the scrolling regions 906-908 may overlap each other.

Two scrolling elements may be merged, where the path of the dominant scrolling region is used to determine the motion vectors. An error prediction can be calculated as a difference (delta) between the reference image and the blended block consisting of the two elements. This algorithm can be extended to more than two overlapping motion elements.

Video signals produced by the disclosed scrolling encoder or by the disclosed methods may be displayed on any suitable screen, including a television screen, computer screen, mobile television screen and portable video player.

The standard and motion vector encoders, encoding controllers, combiners, scrolling encoders, encoder platforms, renderers and other components described above can be implemented in software executed by a general-purpose computer or by dedicated hardware, such as a dedicated processor executing instructions stored in a memory. The memory can be random access memory (RAM), read-only memory (ROM), flash memory or any other memory suitable for storing other instructions and data.

A scrolling encoder, encoder platform and other components have been described as including a processor controlled by instructions stored in a memory. Some of the functions performed by these components have been described with reference to flowcharts. Those skilled in the art should readily appreciate that functions, operations, decisions, etc. of all or a portion of each block, or a combination of blocks, of the flowcharts can be implemented as computer program instructions, software, hardware, firmware or combinations thereof. Those skilled in the art should also readily appreciate that instructions or programs defining the functions of the present invention can be delivered to a processor in many forms, including, but not limited to, information permanently stored on non-writable storage media (e.g. read only memory devices within a computer, such as ROM, or devices readable by a computer I/O attachment, such as CD-ROM disks), information alterably stored on writable storage media (e.g. floppy disks, hard drives, flash memories) or information conveyed to a computer through communication media, including computer networks. In addition, while the invention may be embodied in software, the functions necessary to implement the invention may alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What is claimed is:

1. A method for encoding a scrolling element so the scrolling element can be scrolled through a scrolling region in accordance with path information, without searching for a reference frame or a reference macroblock, the method comprising:
    standard encoding the scrolling element for at least one frame; and
    for at least one subsequent frame:
    calculating a location for the scrolling element based on the path information;
    determining, based on the path information, at least one motion vector that references a previously-encoded frame; and
    encoding the scrolling element using the least one calculated motion vector,
    wherein calculating the location for the scrolling element comprises calculating an X coordinate, within the subsequent frame, of the scrolling element according to the formula:

$$X = X(\text{previous}) + (\text{speed} \times \text{delta frame number}),$$

where:
    X(previous) represents an X coordinate at which the scrolling element was displayed in the previously-encoded frame;
    speed represents a speed of the scrolling element; and
    delta frame number represents a difference between the subsequent frame and the previously-encoded frame.

2. A method for encoding a scrolling element so the scrolling element can be scrolled through a scrolling region in accordance with path information, without searching for a reference frame or a reference macroblock, the method comprising:
    standard encoding the scrolling element for at least one frame; and
    for at least one subsequent frame:
    calculating a location for the scrolling element based on the path information;
    determining, based on the path information, at least one motion vector that references a previously-encoded frame; and
    encoding the scrolling element using the least one calculated motion vector,
    wherein calculating the at least one motion vector comprises calculating an X coordinate, within a previously-encoded frame, of a macroblock according to the formula:

$$X = X(\text{encode}) - (\text{speed} \times \text{delta time}),$$

where:
    X(encode) represents an X coordinate of a macroblock in the subsequent frame;
    speed represents a speed of the scrolling element; and
    delta time represents a difference between a time associated with the subsequent frame and a time associated with the previously-encoded frame.

3. A method for encoding a scrolling element so the scrolling element can be scrolled through a scrolling region in accordance with path information, without searching for a reference frame or a reference macroblock, the method comprising:
    standard encoding the scrolling element for at least one frame; and
    for at least one subsequent frame:
    calculating a location for the scrolling element based on the path information;
    determining, based on the path information, at least one motion vector that references a previously-encoded frame; and
    encoding the scrolling element using the least one calculated motion vector,
    wherein calculating the location for the scrolling element comprises calculating an Y coordinate, within the subsequent frame, of the scrolling element according to the formula:

$$Y = Y(\text{previous}) + (\text{speed} \times \text{delta frame number}),$$

where:
    Y(previous) represents an Y coordinate at which the scrolling element was displayed in the previously-encoded frame;
    speed represents a speed of the scrolling element; and
    delta frame number represents a difference between the subsequent frame and the previously-encoded frame.

4. A method for encoding a scrolling element so the scrolling element can be scrolled through a scrolling region in accordance with path information, without searching for a reference frame or a reference macroblock, the method comprising:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, wherein calculating the at least one motion vector comprises calculating an Y coordinate, within a previously-encoded frame, of a macroblock according to the formula:

$$Y=Y(\text{encode})-(\text{speed}\times\text{delta time}),$$

where:

Y(encode) represents an Y coordinate of a macroblock in the subsequent frame;

speed represents a speed of the scrolling element; and delta time represents a difference between a time associated with the subsequent frame and a time associated with the previously-encoded frame.

5. A method for encoding a scrolling element so the scrolling element can be scrolled through a scrolling region in accordance with path information, without searching for a reference frame or a reference macroblock, the method comprising:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, wherein calculating the location for the scrolling element comprises calculating an X coordinate and an Y coordinate, within the subsequent frame, of the scrolling element according to the formula:

$$X=X(\text{previous})+(\text{speed }X\times\text{delta frame number}),$$

$$Y=Y(\text{previous})+(\text{speed }Y\times\text{delta frame number}),$$

where:

X(previous) represents an X coordinate at which the scrolling element was displayed in the previously-encoded frame;

Y(previous) represents an Y coordinate at which the scrolling element was displayed in the previously-encoded frame;

speed X represents a speed of the scrolling element in the X direction;

speed Y represents a speed of the scrolling element in the Y direction;

and delta frame number represents a difference between the subsequent frame and the previously-encoded frame.

6. A method for encoding a scrolling element so the scrolling element can be scrolled through a scrolling region in accordance with path information, without searching for a reference frame or a reference macroblock, the method comprising:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, wherein calculating the at least one motion vector comprises calculating an X coordinate and a Y coordinate, within a previously-encoded frame, of a macroblock according to the formula:

$$X=X(\text{encode})-(\text{speed }X\times\text{delta time}),$$

$$Y=Y(\text{encode})-(\text{speed }Y\times\text{delta time}),$$

where:

X(encode) represents an X coordinate of a macroblock in the subsequent frame;

Y(encode) represents an Y coordinate of a macroblock in the subsequent frame;

speed X represents a speed of the scrolling element in the X direction;

speed Y represents a speed of the scrolling element in the Y direction; and delta time represents a difference between a time associated with the subsequent frame and a time associated with the previously-encoded frame.

7. A method according to claim 1, wherein the scrolling element is at least a portion of an image.

8. A method according to claim 1, wherein the scrolling element is textual.

9. A method according to claim 1, wherein the scrolling element is a combination of text and an image.

10. A method according to claim 1, wherein standard encoding the scrolling element comprises encoding the scrolling element in at least one macroblock.

11. A method according to claim 1, further comprising:

encoding video contents; and combining the encoded video contents and the encoded scrolling element, such that the scrolling element and at least part of the encoded video contents occupy a common set of frames.

12. A method for encoding a scrolling element so the scrolling element can be scrolled through a scrolling region in accordance with path information, without searching for a reference frame or a reference macroblock, the method comprising:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, further comprising:

standard encoding a second scrolling element for at least one frame, the second scrolling element to be scrolled through a second scrolling region according to second path information;

for the at least one subsequent frame:

calculating a second location for the second scrolling element based on the second path;

calculating, based on the second path information, at least one second motion vector that references a previously-encoded frame; and encoding the second scrolling element using the at least one second motion vector; and combining the encoded scrolling element and the second encoded scrolling element, such that the two scrolling elements occupy a common set of frames.

13. A method for encoding a scrolling element so the scrolling element can be scrolled through a scrolling region in accordance with path information, without searching for a reference frame or a reference macroblock, the method comprising:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, further comprising:

standard encoding N additional scrolling elements, the N scrolling elements each to be scrolled according to path information; and for the at least one subsequent frame:

calculating a second location for each of the N scrolling elements to be displayed in the subsequent frame according to respective path information;

calculating, based on the path information for each of the N scrolling elements to be displayed in the subsequent frame, at least one motion vector that references a previously-encoded frame; and encoding the N scrolling elements using the motion vector calculated for each respective scrolling element.

14. A method according to claim 13 further comprising:
combining the encoded scrolling element and the N additional encoded scrolling elements, such that at least a plurality of scrolling elements occupy a common set of frames.

15. A method according to claim 12, further comprising:
encoding video contents; and
combining the encoded video contents and the two encoded scrolling elements, such that the two scrolling elements and at least part of the encoded video contents occupy a common set of frames.

16. A computer program product for encoding a scrolling element so the scrolling element can be scrolled through a scrolling region in accordance with path information, without searching for a reference frame or a reference macroblock, the computer program product comprising:

standard encoding the scrolling element for at least one frame; and for at least one subsequent frame:

a non-transitory computer-readable medium on which are stored computer instructions for:

calculating a location for the scrolling element based on the path information;

determining, based on the path information, at least one motion vector that references a previously-encoded frame; and encoding the scrolling element using the least one calculated motion vector, wherein calculating the location for the scrolling element comprises calculating an X coordinate, within the subsequent frame, of the scrolling element according to the formula:

$$X=X(\text{previous})+(\text{speed} \times \text{delta frame number}),$$

where:

X(previous) represents an X coordinate at which the scrolling element was displayed in the previously-encoded frame;

speed represents a speed of the scrolling element; and delta frame number represents a difference between the subsequent frame and the previously-encoded frame.

17. A computer program product for encoding a scrolling element so the scrolling element can be scrolled through a scrolling region in accordance with path information, without searching for a reference frame or a reference macroblock, the computer program product comprising:

standard encoding the scrolling element for at least one frame; and for at least one subsequent frame:

a non-transitory computer-readable medium on which are stored computer instructions for:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, wherein calculating the at least one motion vector comprises calculating an X coordinate, within a previously-encoded frame, of a macroblock according to the formula:

$$X=X(\text{encode})-(\text{speed} \times \text{delta time}),$$

where:

X(encode) represents an X coordinate of a macroblock in the subsequent frame;

speed represents a speed of the scrolling element; and delta time represents a difference between a time associated with the subsequent frame and a time associated with the previously-encoded frame.

18. A computer program product for encoding a scrolling element so the scrolling element can be scrolled through a scrolling region in accordance with path information, without searching for a reference frame or a reference macroblock, the computer program product comprising:

standard encoding the scrolling element for at least one frame; and for at least one subsequent frame:

a non-transitory computer-readable medium on which are stored computer instructions for:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, wherein calculating the location for the scrolling element comprises calculating an Y coordinate, within the subsequent frame, of the scrolling element according to the formula:

$$Y=Y(previous)+(speed \times delta\ frame\ number),$$

where:

Y(previous) represents an Y coordinate at which the scrolling element was displayed in the previously-encoded frame;

speed represents a speed of the scrolling element; and delta frame number represents a difference between the subsequent frame and the previously-encoded frame.

19. A computer program product for encoding a scrolling element so the scrolling element can be scrolled through a scrolling region in accordance with path information, without searching for a reference frame or a reference macroblock, the computer program product comprising:

standard encoding the scrolling element for at least one frame; and for at least one subsequent frame:

a non-transitory computer-readable medium on which are stored computer instructions for:

standard encoding the scrolling element for at least one frame; and for at least one subsequent frame:

calculating a location for the scrolling element based on the path information;

determining, based on the path information, at least one motion vector that references a previously-encoded frame; and encoding the scrolling element using the least one calculated motion vector, wherein calculating the at least one motion vector comprises calculating an Y coordinate, within a previously-encoded frame, of a macroblock according to the formula:

$$Y=Y(encode)-(speed \times delta\ time),$$

where:

Y(encode) represents an Y coordinate of a macroblock in the subsequent frame;

speed represents a speed of the scrolling element; and delta time represents a difference between a time associated with the subsequent frame and a time associated with the previously-encoded frame.

* * * * *